R. LISTER.
MACHINE FOR TRIMMING FRUIT.
APPLICATION FILED MAR. 4, 1912.

1,065,455.

Patented June 24, 1913.

3 SHEETS—SHEET 3.

Witnesses.

Inventor.
Robert Lister

UNITED STATES PATENT OFFICE.

ROBERT LISTER, OF HONOLULU, TERRITORY OF HAWAII.

MACHINE FOR TRIMMING FRUIT.

1,065,455.  Specification of Letters Patent.  Patented June 24, 1913.

Application filed March 4, 1912. Serial No. 681,515.

*To all whom it may concern:*

Be it known that I, ROBERT LISTER, a citizen of the United States, residing at Honolulu, in the county of Honolulu, Territory of Hawaii, have invented certain new and useful Improvements in Machines for Trimming Fruit; and I do hereby declare the following to be a full, clear, and exact description of the invention, such as will enable others skilled in the art to which it appertains to make and use the same.

This invention relates to machines for trimming fruit, particularly pineapples or similar fruit.

In the preparation of pineapples for canning, the rind or outer portion is removed automatically and simultaneously with the sizing operation, by means of machines such as are described in the patent to A. E. Lister, No. 978,383, dated Dec. 13, 1910. More or less good fruit, however, has heretofore been discarded with the segments of rind which are produced by this process, for the reasons, that the fruit is larger near its middle than at its ends, that the fruit does not grow perfectly symmetrical, and that the fruit is not always properly centered in the machine.

The object of this invention is to produce means for trimming these segments of rind in order that the good portion of fruit thereon may be utilized and not as heretofore wasted, and a further object is to accomplish this result in a rapid and efficient manner.

My invention contemplates a grid upon which the segments of rind which are fed to the machine are automatically conveyed under pressure, and means for trimming or cutting the fruit to separate same from the rind while the segments are passing over the grid. By means of a machine embodying my present invention one pineapple cannery has been able to utilize more than half of what had formerly been wasted with the rind.

The invention consists in the combination and arrangement of parts as hereinafter described and claimed, reference being had to the accompanying drawings, forming a part of this specification, in which—

Figure 1:
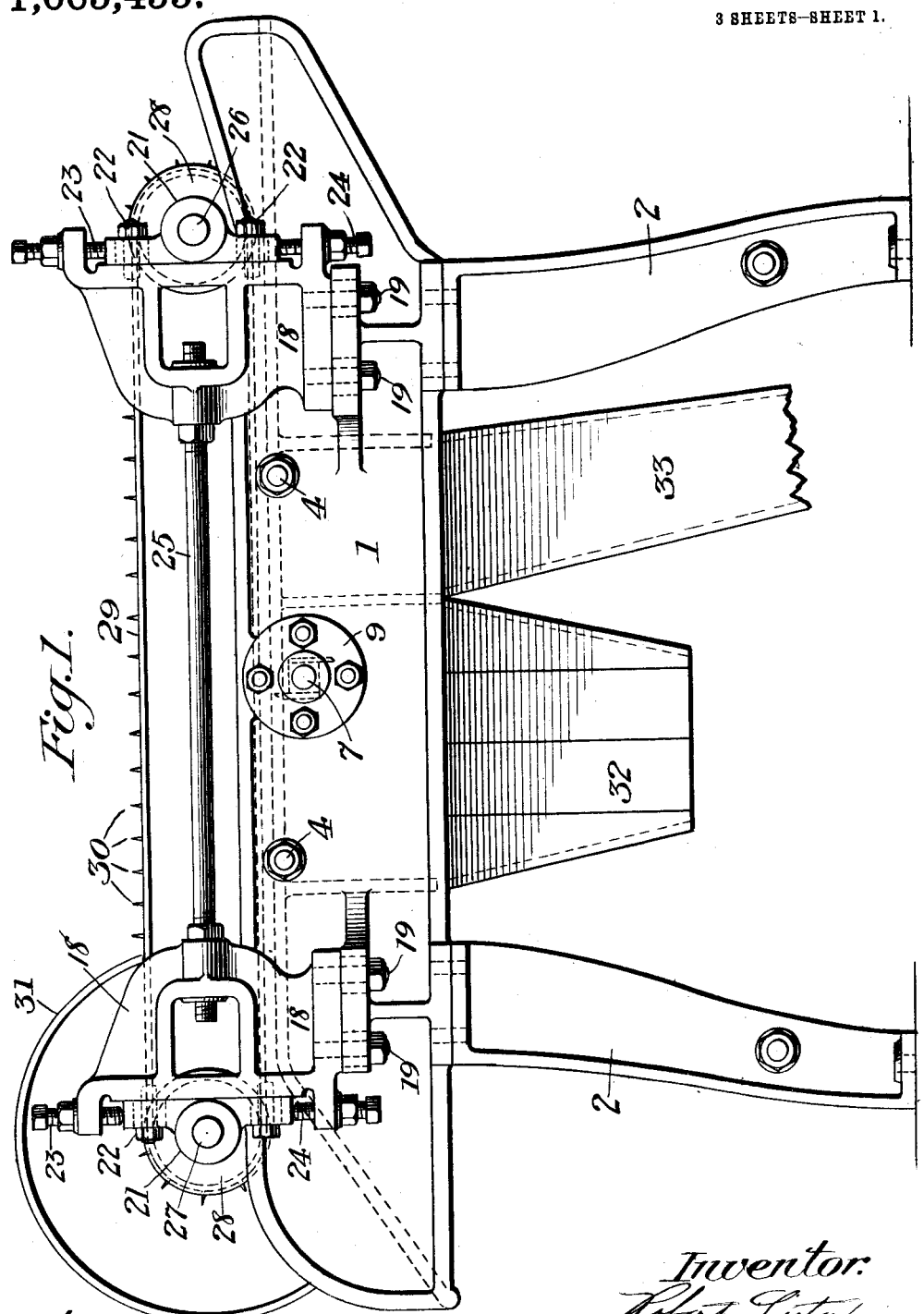
Figure 2:
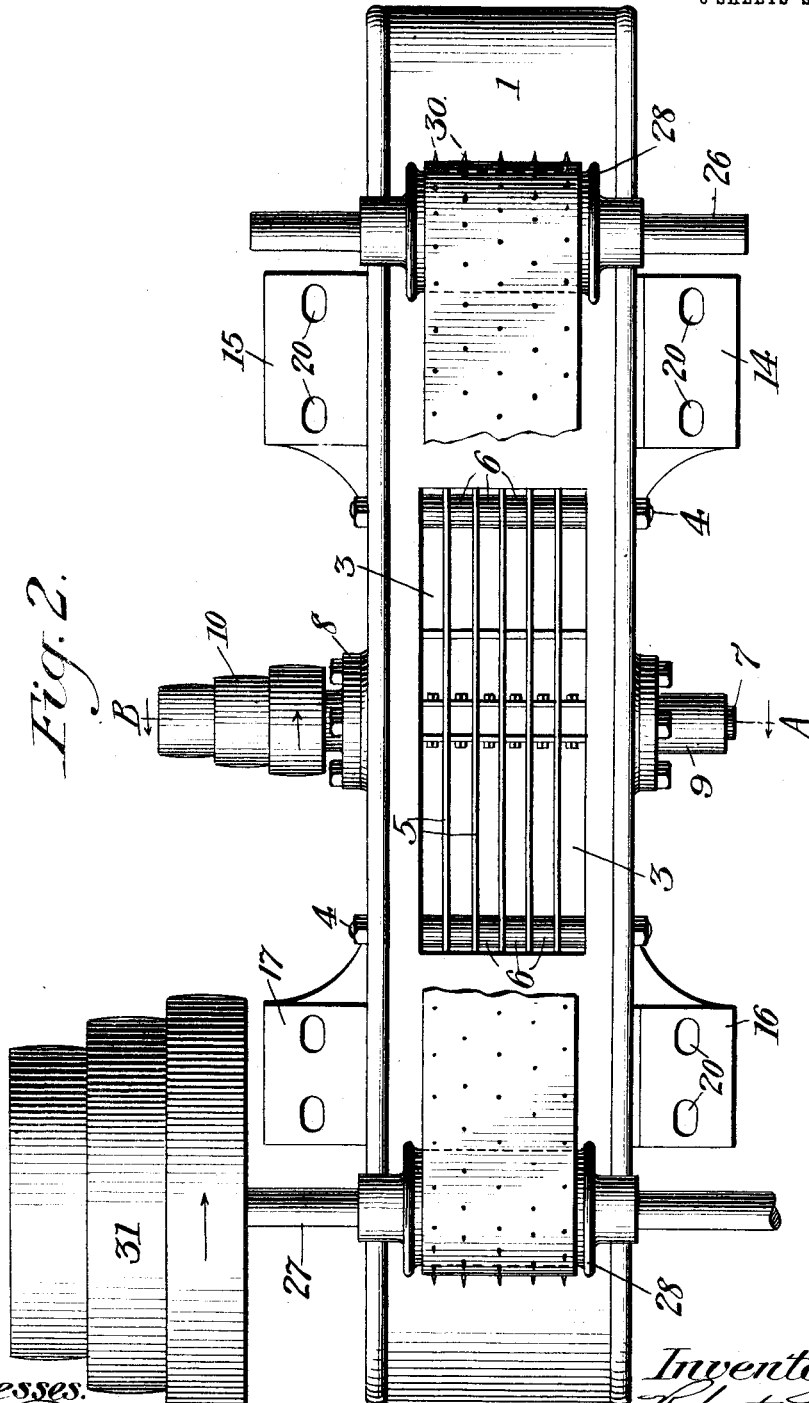
Figure 3:
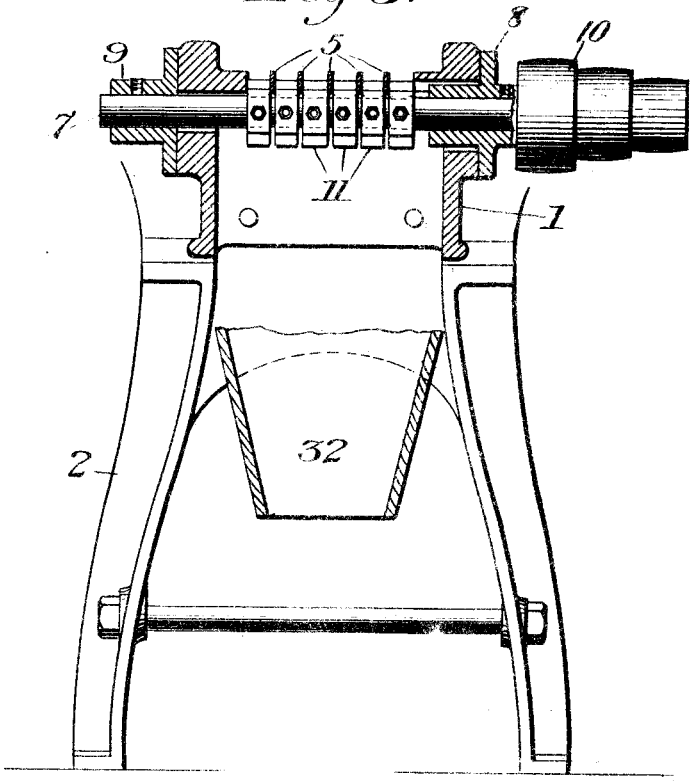
Figure 5:
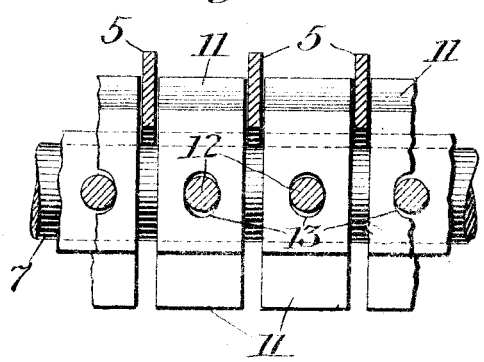
Figure 4:
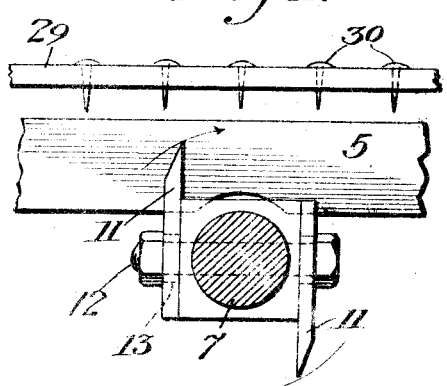

Figure 1 is a side elevation of a preferred form of machine for trimming fruit embodying my invention. Fig. 2 is a plan view of same with the belt broken away and the stands and bearings for the drum shafts omitted. Fig. 3 is a sectional elevation on the line A—B of Fig. 2. Fig. 4 is a sectional view on a larger scale of the knife shaft and the conveyer belt in their relation to the grid. Fig. 5 is an enlarged view of a portion of Fig. 3 showing the relation of the bars of the grid to the knife shaft and its knives.

Referring to the drawings, the bed 1 of the machine is preferably a casting of the shape as shown and supported by the legs 2. The top of the bed 1 near the middle of the machine is provided with a rectangular opening 3 to receive a grid secured in said opening by means of two transverse bolts 4. The grid consists of flat bars 5 on edge with separators 6 between the ends of the bars. The bolts 4 pass through the bars 5 and separators 6. The flat bars 5 are parallel to the longitudinal center line of the machine and their upper edges are flush with the top of the bed 1 around the opening 3.

The knife shaft 7 is journaled in the boxes 8 and 9 secured to opposite sides of the bed 1 at about the middle of the machine and just below the bars 5 of the grid. A driving pulley 10, preferably a cone pulley, is secured to one end of the shaft 7. A plurality of knives 11 are adjustably secured to opposite sides of the shaft 7 by bolts 12 which pass through said shaft and through elongated holes or slots 13 in the knives 11. The knives 11 are adapted to revolve with the shaft 7 between the flat bars 5 of the grid, and to be adjusted so as to cut more or less of the fruit when the segments are moved along on said bars as will hereinafter more fully appear.

Brackets 14 15 and 16 17 are cast on opposite sides of the bed 1 near the feed and discharge ends of the machine respectively. A stand 18 is adjustably secured upon each of these brackets by the stud bolts 19 which pass through elongated holes or slots 20 in said brackets. A journal box 21 is bolted to each stand 18 by bolts 22, and adjusting screws 23 and 24 are provided in the stands 18 above and below the journal boxes 21 respectively for the vertical adjustment of the latter. A strut bolt 25 connects the stands 18 on each side of the machine. Shafts 26 and 27 are journaled in the journal boxes 21 and are thus mounted transversely above and near the feed and discharge ends of the machine respectively. Each of the shafts 26 and 27 is provided with a flat faced drum 28 between the journal boxes 21, said drums being preferably flanged. An endless belt 29, provided with tacks 30 or the like, is passed around the drums 28. The rear shaft 27 is provided with a driving pulley 31. Two chutes 32 and 33 preferably of wood depend from the bed 1, Fig. 1.

The operation of the machine will now be apparent. The stands 18 are first adjusted on their respective brackets and the strut bolts 25 are tightened up until the belt 29 is stretched tightly over the drums 28, and at the same time the shafts 26 and 27 are made parallel to each other and to the top of the bed, the journal boxes 21 being adjusted vertically by means of the screws 23 and 24. The belt 29 is usually adjusted so as to clear the top of the bed about ⅜ of an inch, this distance depending however upon the thickness of the rind of the fruit to be trimmed. The pulleys 10 and 31 are then driven in the directions as shown by the arrows by belts from any suitable source of power. The segments of rind are fed to the machine with the rind upward and are caught by the tacks 30 or the like in the belt 29 and are thereby dragged rearward upon the surface of the bed 1. The pressure of the belt 29, which is stretched tightly around the drums 28, flattens out any curvature the fruit had previous to entering between the belt and the bed. The segments soon reach the bars 5 of the grid and are dragged rearward upon same, the pressure of the belt 29 forcing the segments downward so that the bars 5 enter the soft good portion of fruit thereon. The rind however is never lowered below the top of the bars 5 as the belt is adjusted as previously described to accomplish this result. The segments moving on the bars 5 in this manner soon encounter the knives 11 on the revolving shaft 7, that is the portion of good fruit which has been forced between the bars 5 encounters said knives in its path rearward, and is thereby trimmed off and the fruit so cut falls down the chute 32, while the rind and remaining portion of the segments are dragged rearward by the belt 29 and are discharged from the rear end of the bed. The object of the chute 33 is to catch any small pieces of rind or other objectionable matter which may be carried into the machine along with the segments and which will drop through the openings between the bars 5 as soon as the segments reach the grid and before they encounter the knives as above described. If a segment is fed to the machine by mistake with its rind down and next to the bed, instead of up and next to the belt, the segment is dragged through the machine without being trimmed, for the pressure of the belt will not cause the bars of the grid to enter the rind which is harder than the fruit.

The rapidity with which the knives 11 revolve in relation to the speed of the belt 29 has an important bearing on the size of the pieces of fruit trimmed by the machine, for I find that with a given belt speed that increasing the speed of the knives produces a finer product and that decreasing the speed of the knives gives a coarser product, and it is for this reason that a cone pulley on the knife shaft is preferable.

In the foregoing description it is obvious that I have not attempted to describe the numerous modifications which may be adopted without digressing from my inventive idea.

I claim:

1. In a fruit trimming machine, a stationary grid comprising rigid spaced bars, an endless belt for feeding the segments of fruit to be trimmed along said grid, and a series of knife blades operating between the bars of the grid, said knives adapted to trim the fruit from the rind as the segments pass along the grid.

2. In a fruit trimming machine, a stationary grid, knives operating between said grid, an endless feed belt, feed belt pulleys mounted at opposite ends of the machine, and means for adjusting said feed belt pulleys vertically and independent means for adjusting said feed belt pulleys longitudinally of the machine.

3. In a fruit trimming machine, a stationary grid comprising rigid spaced bars, an endless belt for feeding the segments of fruit to be trimmed along said grid, a revolving shaft mounted below the grid, a plurality of knives carried by said shaft and operating between the bars of the grid, and means for rotating said shaft.

4. In a machine for trimming fruit from rind segments, a rigid grid, means to press the rind segments on the grid to force the good portion of the fruit through the grid, and knives coöperating with said grid to trim the good portion of the fruit from the rind segments, said knives being adjustable for the purpose described.

In testimony whereof I affix my signature, in presence of two witnesses.

ROBERT LISTER.

Witnesses:
 ROBT. J. PRATT,
 P. H. BURNETTE.